Nov. 14, 1944.  D. D. STREID  2,362,509
GAS TURBINE AND THE LIKE
Filed March 28, 1942

Inventor:
Dale D. Streid,
by Harry E. Dunham
His Attorney.

Patented Nov. 14, 1944

2,362,509

UNITED STATES PATENT OFFICE 2,362,509

GAS TURBINE AND THE LIKE

Dale D. Streid, West Lynn, Mass., assignor to General Electric Company, a corporation of New York Application March 28, 1942, Serial No. 436,606

4 Claims. (Cl. 248—16)

The present invention relates to gas turbines and the like.

The invention finds especial utility in connection with gas turbine driven superchargers for aircraft and it is this application of my invention which I have elected to specifically illustrate and describe. It is to be understood, however, that this is only by way of example and that my invention may be used wherever found applicable.

In connection with gas turbine driven superchargers for aircraft, there is provided usually a cooling cap which is located in front of the turbine wheel to protect the wheel disk from hot gases issuing from the turbine/wheel buckets, and across or through which air from the aircraft slip stream is circulated to cool the wheel. The cooling cap is supported from the turbine nozzle box which is located on the side of the turbine wheel opposite the side on which the cooling cap is located. Thus the cooling cap which, by reason of the cooling air passing across or through it, is, during operation, maintained at a relatively low temperature, a temperature of the order of 500° F., for example, is supported from a member, the temperature of which may be of the order of 1300° F. This means that in use there is a considerable difference in the amounts of expansion of the cooling cap and its support so that the mounting of the cooling cap on the nozzle box so that at all times it is firmly supported and so that, with the difference in expansion, undue stresses are not set up in any of the parts, has been a serious problem. And the problem has been augmented by the fact that it is necessary to keep the weight at a minimum.

The object of my invention is to provide an improved construction and arrangement for supporting a structure, such as a turbosupercharger cooling cap, which is maintained relatively cool, on a second structure, such as a turbosupercharger nozzle box, which becomes very hot, which is simple in structure, light in weight, permits of differences in expansion taking place without placing any of the parts under undue stresses and at all times maintains the parts firmly supported.

For a consideration of what I believe to be novel and my invention, attention is directed to the following specification and the claims appended thereto.

Figure 1:
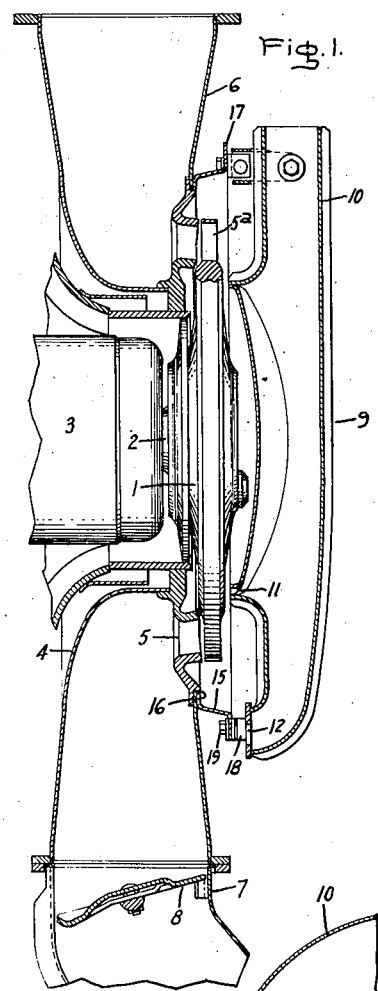
Figure 2:
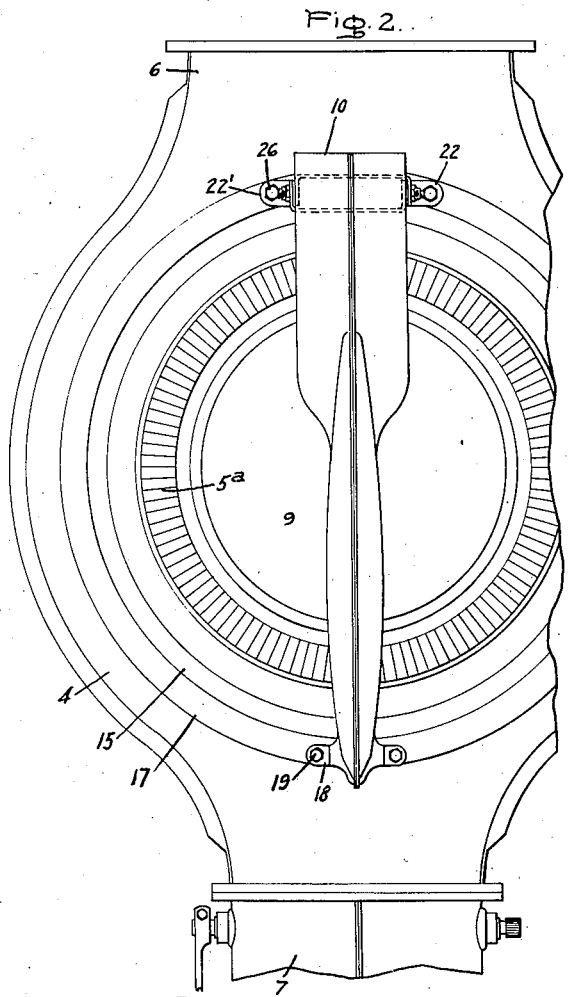
Figure 4:
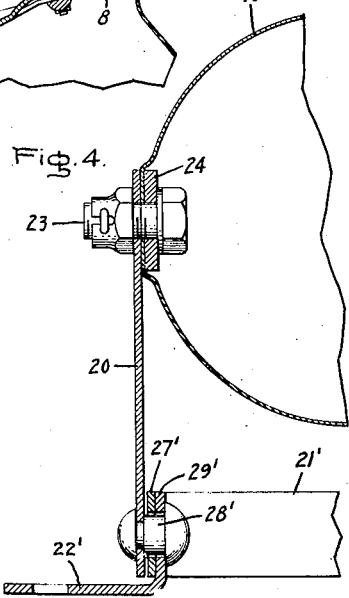
Figure 3:
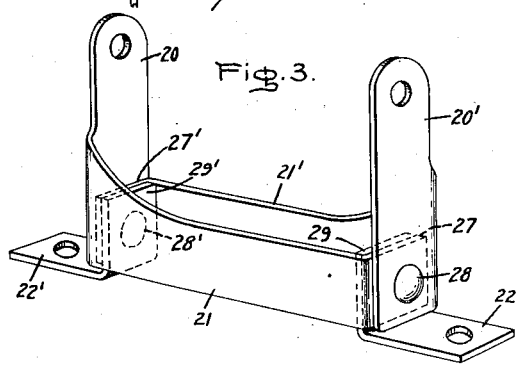

In the drawing, Fig. 1 is a sectional view of a portion of an aircraft turbosupercharger embodying my invention; Fig. 2 is a face view thereof; Fig. 3 is a detail perspective view of a supporting frame, and Fig. 4 is a detail sectional view.

Referring to the drawing, 1 indicates the turbine wheel of an aircraft turbosupercharger mounted on a shaft 2 carried in a bearing 3. Surrounding the bearing 3 in spaced relation thereto and suitably supported from the supercharger structure (by means not shown) is an annular nozzle box 4 having a ring of nozzles 5 for directing actuating gases to the buckets 5a of the turbine wheel. Connected with the nozzle box is an inlet conduit 6 through which gases, for example, exhaust gases from an aircraft engine, are supplied to the nozzle box, and at 7 is the waste conduit in which is located a waste gate valve 8 for regulating the supercharger.

Located in front of the turbine wheel is a cooling cap 9 which may be of any suitable structure and which is provided with an admission conduit 10 through which cooling air, for example, air from the aircraft slip stream, is supplied to the interior of the cooling cap and from which it discharges through passages 11 and 12.

The structure so far described is a known one and is to be taken as typical of any suitable turbosupercharger structure. In operation, the temperature of the nozzle box may reach a value as high as 1300° F. while that of the cooling cap may be of the order of 500° F.

According to the embodiment of my invention illustrated in the drawing, I provide an annular ring 15 which is Z-shaped in cross section and which has one flange attached to the nozzle box by suitable means such as by welding, as is indicated at 16. I then attach the cooling cap to the other flange 17 of the Z-ring at two diametrically opposite points (which may be considered the top and bottom of the cooling cap) by fastening means, one or both of which may comprise a yielding support of novel construction. In the present instance, I have shown a yielding support at the top only of the cooling cap, the bottom of the cap being supported by flanges 18 attached to flange 17 by bolts 19.

The attaching means or support for the upper end of the cooling cap comprises two bracket members alike in structure and each comprising an upright or bracket arm, a torsion cross bar which extends at right angles to the bracket arm and an anchoring ear. In the drawing, the upright or bracket arm, the torsion cross bar and the anchoring ear of one of the bracket members are designated 20, 21 and 22 and the corresponding parts of the other bracket member 20', 21' and 22'. The uprights or bracket arms 20 and 20' are located on opposite sides of inlet conduit 10 and are attached thereto by bolts 23 as shown particularly in Fig. 4, the wall of conduit 10 being reinforced by welded-in inserts 24 at the points of attachment. The anchoring ears 22 and 22' are fixed to flange 17 by suitable bolts 26. Z-ring 15, since it is attached directly to the nozzle box has substantially the same temperature as the nozzle box.

With the foregoing arrangement, it will be seen that each torsion bar 21 and 21' is fixed at one end to the cooling cap and at the other end to the Z-ring flange and that the torsion bars extend transversely of the conduit 10 and at right angles to the radial. The bracket arm of each bracket member at its end remote from the end fixed to the cooling cap is pivotally mounted on the end of the torsion bar of the other bracket member fixed to the Z-ring. To this end, torsion bar 21' is provided with an inturned flange 27' which is parallel to bracket arm 20' and which is pivoted on a stud 28' fixed to the bracket arm 20 (see Fig. 4). Similarly, the torsion bar 21 is provided with an inturned flange 27, which is pivoted on a stud 28, fixed to bracket arm 20'.

The anchoring ears 22 and 22' may be formed in any suitable manner and extend in any suitable direction, the essential thing being that they serve to anchor the ends of the torsion bars to the Z-ring flange. In the present instance, ears 22 and 22' are shown as being separate pieces provided with flanges 29 and 29' suitably welded to flanges 27 and 27'. Preferably ears 22 and 22' are arranged to extend outwardly as shown particularly in Figs. 3 and 4 as this provides for a greater span between the ears and gives full effect to the total length of the torsion bars 21 and 21'.

With the above-described arrangement, the cooling cap is firmly anchored to the nozzle box at both its lower and upper ends. When difference in expansion takes place between the nozzle box and the cooling cap, the bracket arms 20 and 20' pivot about studs 28' and 28, the torsion bars 21 and 21' twisting to permit the relative movement to take place. The torsion bars have sufficient flexibility to permit the movement to take place without placing any of the parts under undue strain. At the same time, the torsion bars serve always to hold the parts against looseness or rattling. The arrangement is such preferably that when initially bolted together, the torsion bars are put under a slight strain or twist so that even when the parts are cold and in their normal positions relatively to each other, they are firmly held together.

By pivotally connecting the two torsion bars together at their ends as shown the torsion bars are held in definite relation to each other so that when relative movement occurs between the cooling cap and the nozzle box, movement of the torsion bars is confined to a twisting of the bars.

As stated above, if desired the parts may be attached to each other by more than a single flexible connection as shown but ordinarily I find a single connection sufficient.

In accordance with the provisions of the patent statutes, I have described the principle of operation of my invention, together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. The combination with two members subject to expansion relatively to each other, of flexible means connecting said members comprising transversely extending torsion bars each fixed at one end to one of said members and having at its other end an angularly extending bracket arm fixed to the other member, adjacent ends of said torsion bars in each instance being pivotally connected together.

2. The combination with two members subject to expansion relatively to each other, of flexible means connecting said members comprising two torsion bars arranged parallel to each other and pivotally connected together at each of their ends, and means connecting opposite ends of the torsion bars to said members.

3. The combination with two members subject to expansion relatively to each other, of flexible means connecting said members comprising two torsion bars arranged parallel to each other and having at each end angularly extending parts pivotally connected together, and means including angularly extending bracket arms for connecting opposite ends of the torsion bars to said members.

4. A flexible bracket for connecting together two members subject to relative movement comprising two parallel torsion bars having at each end angularly extending parts pivoted together, each torsion bar having an attaching ear at one end and an angularly extending attaching bracket arm at the other end.

DALE D. STREID.